(12) United States Patent
Gougeon et al.

(10) Patent No.: US 10,889,159 B2
(45) Date of Patent: Jan. 12, 2021

(54) DRIVING DEVICE COMPRISING AN ACTUATOR ALLOWING TO DRIVE THE DRIVING DEVICE

(71) Applicant: FAURECIA INTERIEUR INDUSTRIE, Nanterre (FR)

(72) Inventors: Fabien Gougeon, Franconville (FR); Wassim Bouzerda, Antony (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 170 days.

(21) Appl. No.: 15/923,733

(22) Filed: Mar. 16, 2018

(65) Prior Publication Data

US 2018/0281555 A1 Oct. 4, 2018

(30) Foreign Application Priority Data

Mar. 29, 2017 (FR) ..................... 17 52643

(51) Int. Cl.
| | |
|---|---|
| *B60H 1/34* | (2006.01) |
| *B60H 1/00* | (2006.01) |
| *G05G 9/04* | (2006.01) |
| *B60K 35/00* | (2006.01) |

(52) U.S. Cl.
CPC ......... *B60H 1/0065* (2013.01); *B60H 1/3421* (2013.01); *B60K 35/00* (2013.01); *G05G 9/04* (2013.01); *B60H 2001/3471* (2013.01); *B60K 2370/12* (2019.05); *B60K 2370/133* (2019.05)

(58) Field of Classification Search
CPC .... B60H 1/0065; B60H 1/3421; B60H 35/00; G05G 9/04
USPC ....................................................... 454/155
See application file for complete search history.

(56) References Cited

U.S. PATENT DOCUMENTS

2016/0104589 A1    4/2016   Kwak

FOREIGN PATENT DOCUMENTS

| DE | 102012020539 A1 | 4/2014 |
| DE | 102015004062 A1 | 8/2015 |
| FR | 3028810 A1 | 5/2016 |

OTHER PUBLICATIONS

French Preliminary Search Report for application No. FR1752643, dated Dec. 6, 2017, 2 pages.

*Primary Examiner* — Helena Kosanovic
(74) *Attorney, Agent, or Firm* — Reising Ethington P.C.

(57) ABSTRACT

A control device that includes a body, a movable element that is movable according to a first degree of freedom relative to the body, an actuator for moving the movable element relative to the body, and a secondary control device. The secondary control device has a switch movable between an open position in which a function is deactivated and a closed position in which the function is activated. The actuator is movable according to a second degree of freedom between a spaced apart position and a control position in which the actuator moves the switch between its open position and its closed position.

11 Claims, 4 Drawing Sheets

DRIVING DEVICE COMPRISING AN ACTUATOR ALLOWING TO DRIVE THE DRIVING DEVICE

TECHNICAL FIELD

The present invention relates to a control device of an interior piece of equipment of a vehicle, of the type comprising:
- a body,
- at least one movable element that is movable according to at least one first degree of freedom with respect to the body,
- at least one actuator making it possible to move the movable element relative to the body in the first degree of freedom, and
- at least one secondary control device for controlling a function of the control device, a switch of the secondary control device being movable between an open position in which the function is deactivated, and a closed position in which the function is activated.

BACKGROUND

Such a control device is, for example, an air outlet device of a ventilation system of the vehicle.

The ventilation system of the cab of a vehicle generally opens up through an orifice in a trim element the cab of the vehicle, for example, a dashboard, a door panel, a central console, a ceiling lamp, etc. of the vehicle. An air outlet device, or ventilator, forms this orifice and makes it possible to control the direction and/or the flow rate of the air flow leaving the ventilation system.

To this end, the air outlet device comprises at least one movable element forming a deflector, for example a fin, a set of fins or other element, which is movable relative to the air outlet orifice so that its movement makes it possible to direct the air flow leaving the orifice in a particular direction. The movement is controlled manually by a user by means of an integrated actuator moving the deflector.

Such an air outlet device generally further comprises a control device for controlling at least one function of the device, for example to activate or not the emission of air, etc. Such a control device is, for example, controlled by a user by operating a switch that activates or deactivates the function. The operation of the switch is carried out, for example, by means of a button arranged in the vicinity of the air outlet orifice, or facing the outlet orifice, or located in a control zone grouping a plurality of control buttons to control different functions of the vehicle.

Therefore, in order to use the air outlet device, a user must first operate the control button and then operate the actuator. The user cannot control the air outlet device in one movement. In addition, the presence of the control button increases the size of the air outlet device and may affect the aesthetics of the cab in which it is installed.

The same problem may arise for other types of control devices when they comprise a movable element whose position or orientation is controlled by an actuator and a control button for the control of a function of the control device.

SUMMARY

One of the objects of the invention is to overcome these drawbacks by providing a control device whose operation is simplified and that is of a reduced size.

To this end, the invention relates to a control device of the aforementioned type, wherein the actuator is movable according to a second degree of freedom with respect to the body, between a spaced apart position, in which the actuator does not interact with the secondary control device, and a control position in which the actuator moves the switch between its open position and its closed position.

Thus, in the control device according to an embodiment of the invention, the actuator makes it possible both to move the movable element and to control the function of the secondary control device. The presence of an additional control button is, therefore, not necessary and simplifies the use of the control device while reducing its bulk.

Various embodiments of the invention may include the following other features of the control device, taken alone or in any technically feasible combination:
- the actuator is mounted on an actuating element that is mounted in at least one support that is mounted on the body, the actuating element and the support being movable according to the second degree of freedom with respect to the body between a spaced position and an activation position, the support actuating the switch in the activation position;
- the actuating element is formed by the movable element, the actuating element being further movable according to the first degree of freedom relative to the support;
- the actuating element is formed by a separate element that is distinct from the movable element, the actuator being mounted to be movable according to the first degree of freedom with respect to the actuating element and relative to the support;
- the body comprises at least one guide element of the support, the support being movable according to the second degree of freedom in the guide element between its spaced apart position and its activation position;
- the switch is in the open position in the spaced apart position of the support, and in the closed position in the activation position of the support;
- the spaced apart position and the activation position of the support are stable positions;
- the support is biased towards its spaced apart position, the actuation of the switch towards its open position and towards its closed position being effected by moving the support from the spaced apart position to the activation position;
- the control device comprises at least two secondary control devices, each for controlling a function of the control device, the actuating element being mounted on at least two supports mounted on the body, the supports being each movable in the second degree of freedom relative to the body between a spaced apart position and an activation position, the supports each operating one of the switches of the secondary control devices in their activation position;
- the first degree of freedom is a displacement in rotation about an axis of the movable element;
- the second degree of freedom is a displacement in translation of the actuator; and
- the control device is an air outlet device of a vehicle ventilation system, the body defining an air outlet orifice arranged to inject a flow of air into the cab of the vehicle, the movable element being a deflector that changes the orientation and/or the flow rate of the air flow from the air outlet orifice when it is moved according to the first degree of freedom.

BRIEF DESCRIPTION OF THE DRAWINGS

Other aspects and advantages of the invention will become apparent upon reading the following description, given by way of example and with reference to the appended drawings, wherein.

DETAILED DESCRIPTION

Figure 1:
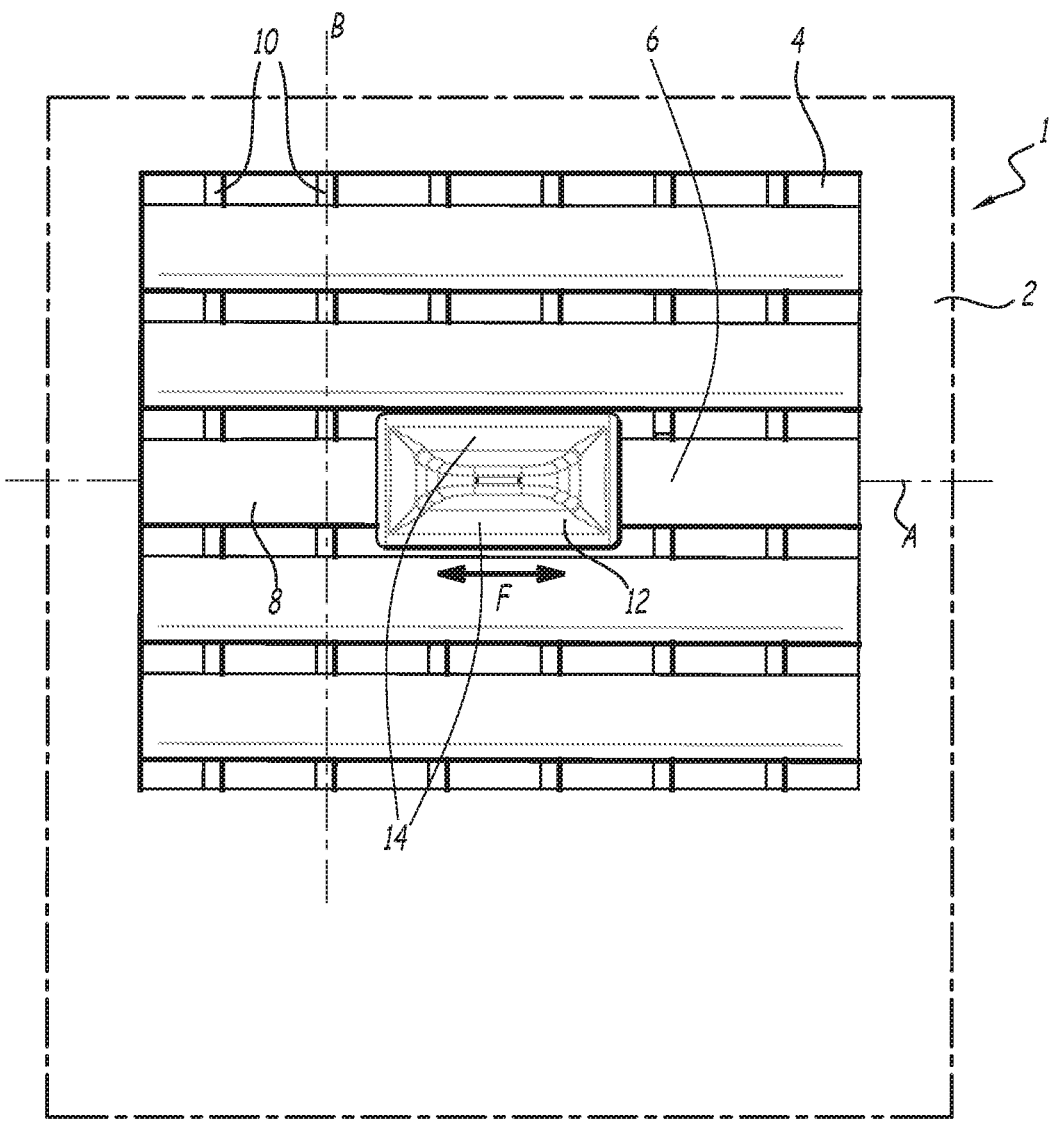
FIG. 1 shows a schematic front view of a control device according to a first embodiment of the invention.

A control device 1, in this case an air outlet device or vehicle ventilator, is described with reference to FIGS. 1 and 2. Such an air outlet device is conventionally intended to form an air outlet orifice extending in a trim element (not shown) of the cab of a vehicle, for example a dashboard, a door panel, a center console, a ceiling lamp or other element. The invention applies, for example, to a ventilation system of a motor vehicle. In the following description, the control device 1 is in the form of an air outlet device. It should be understood, however, that the invention may be applied to other types of control devices, such as a control device for the illumination of the cab of the vehicle or of a trim element, or a device for the control of the sound volume of an audio device of the cab, or other element.

In the description, the term "longitudinal" is defined as the direction of the air flow of the ventilation system, while the term "transverse" is defined as a direction perpendicular to the longitudinal direction.

Conventionally, the control device 1 comprises a body 2 defining the air outlet orifice 4 that opens up through the trim element and is connected to an air duct of the ventilation system in order to inject a flow of air from the ventilation system into the cab of the vehicle.

At least one movable element 6, for example a deflector comprising at least one air guiding surface in the case of an air outlet device, is mounted on the body 2. In the case of an air outlet device, the movable element 6 is mounted transversely to the orifice 4 in order to change the orientation and/or the flow rate of the airflow leaving the orifice as a result of the orientation of the movable element 6 relative to the orifice 4. The movable element 6 is, for example, in the form of a fin extending transversely from one edge to the other of the orifice 4. Alternatively, the movable member 6 may be formed by a plurality of fins connected to each other and extending transversely from one edge to the other of the orifice 4 and parallel to each other. Such a set of fins is, for example, known as a "barrel". According to yet another embodiment, the movable element 6 is formed by several air guide surfaces extending in different planes, for example surfaces forming a cross and extending across a cylindrical wall that is itself mounted on the body 2. According to another variant shown in FIG. 1, the control device 1 comprises a plurality of movable elements 6, for example each in the form of a fin, a first set of fins 8 extending in a first transverse direction A from one edge to the other of the orifice 4, while a second set of fins 10 extends in a second transverse direction B that is substantially perpendicular to the first transverse direction A from one edge to the other of the orifice 4, and extends upstream of the first set of fins 8 with respect to the direction of the airflow.

The, or each, movable element 6 is mounted to be movable relative to the body 2 according to at least a first degree of freedom. In the case of a fin, the movement according to the first degree of freedom may be, for example, a rotational movement about the axis A along which the fin extends, i.e. a transverse axis. In the case of a barrel, the movement according to a first degree of freedom is a rotational movement about a central transverse axis parallel to the direction in which the fins of the barrel extend. In the case of a deflector comprising a plurality of guide surfaces extending in different planes, the movement according to a first degree of freedom is a rotational movement of the "patellar" type, i.e. the deflector can rotate about several axes of rotation extending in different directions, including at least one longitudinal and one transverse direction. In the case of a first set of fins 8 and a second set of fins 10, each fin is rotatable about the transverse axis along which it extends, i.e. in a first transverse direction for the fins of the first set of fins 8 and in a second transverse direction for the fins of the second set of fins 10. In this case, a system connecting the fins of the first set of fins 8 and a system connecting the fins of the second set of fins 10 may be provided, so that the rotation of a fin of the first set of fins 8 causes the rotation of the other fins of this set, while the rotation of a fin of the second set of fins 10 causes the rotation of the other fins of this set. The different variants of movable elements 6 described above and their movement relative to the body 2 are known per se in the context of an air output device. It should be noted that in the case of another type of control device, the movement according to the first degree of freedom of the movable member may be a translation movement in a first direction.

The air outlet device 1 further comprises an actuator 12 arranged to move the movable element 6 according to the first degree of freedom. The actuator 12 is mounted on an actuating element.

According to a first embodiment shown in FIG. 1, the actuating element is formed by the movable element 6 so that the actuator 12 is mounted on the movable element 6, and that the actuator 12 is movable with the movable element 6 according to the first degree of freedom.

Figure 2:
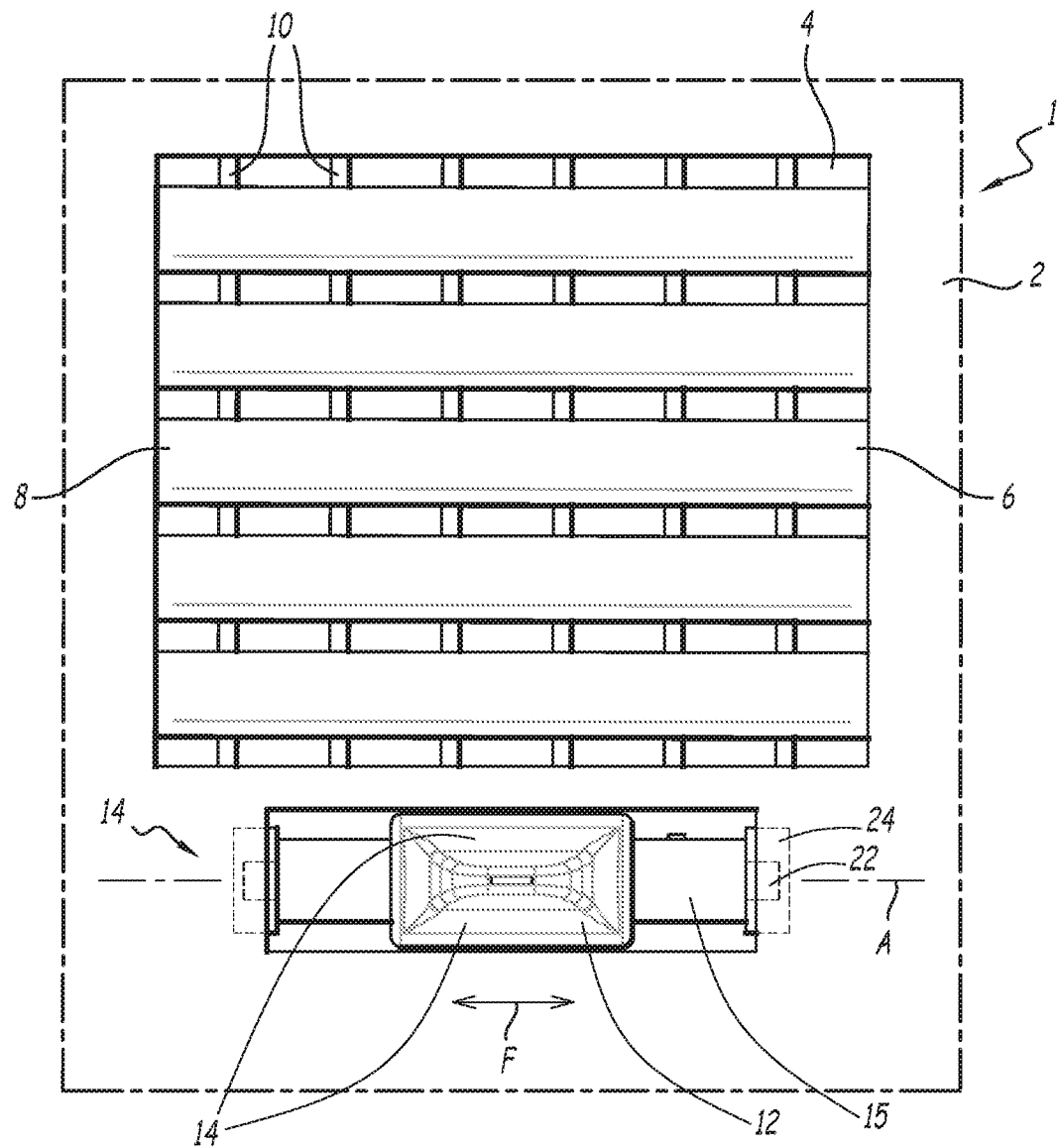
FIG. 2 shows a schematic front view of a control device according to a second embodiment of the invention.

Thus, in the case of a fin, the actuator 12 is, for example, formed by a tongue mounted around the fin and forming gripping surfaces 14 that are designed to be gripped by a user as shown in FIGS. 1 and 2. Thus, in a known manner, the user gripping the actuator 12 and moving it according to the first degree of freedom, causes the displacement of the movable element 6 according to the first degree of freedom and modifies the direction of the flow of air leaving the orifice.

In the case of a first and second set of fins 8, 10, the actuator 12 may be arranged to allow the displacement of the fins of the first set of fins 8 and the displacement of the fins of the second set of fins 10, as is known per se. To do this, the actuator 12 is secured to a fin of the first set of fins 8 and is movable with it according to the first degree of freedom. Furthermore, the actuator 12 is movable in translation on the first fin along the axis of this fin, as represented by the arrow F in FIG. 1, and connected to a fin of the second set. Thus, by rotating the actuator about the axis of the first fin, the fins of the first set of fins 8 may be moved, and, by moving the actuator in translation on the first fin, the fins of the second set of fins 10 are rotated about their axis. In such an embodiment, the first set of fins 8 allows orienting the air vertically, while the second set of fins 10 allow directing the air from right to left in the case of an air outlet orifice extending substantially vertically.

According to the embodiment shown in FIG. 2, the actuating element is formed by an element 15 that is distinct from the movable element 6, so that the actuator 12 is separated from the movable element 6. The actuating element 15 is then provided in an orifice that is distinct from the air outlet orifice 4 provided in the body 2. The actuator 12 is movable on the actuating element 15 relative to the body according to the first degree of freedom, and is connected to the movable element 6 by a transmission device (not shown), so that the displacement of the actuator 12 on the actuating element 15 according to the first degree of freedom causes the displacement of the movable element 6 according to the first degree of freedom. In the case of a second set of fins 10, the actuator 12 may also be mounted to move in translation on the actuating element 15 as represented by the arrow F in FIG. 2. The actuating element 15 is, for example, in the form of a bar extending along an axis substantially parallel to the axis of the first degree of freedom in the opening that is distinct from the air outlet orifice.

For simplicity, the following description is given in the case of a movable element 6 formed by a fin, the embodiment of the invention being implemented in the same manner with the other movable elements described above.

Furthermore, the actuator 12 is movable according to a second degree of freedom, as will be described later, in order to control at least one secondary control device 16 controlling a function of the control device 1 that is partially shown in FIGS. 4 and 5.

The secondary control device 16 is arranged to allow a function of the control device 1 to be switched on or off, for example to start or stop the emission of conditioned air by the ventilation system, to switch a fan on or off, or to switch on or off the front lighting of the control device. The secondary control device 16 extends appropriately in the body 2 and in the trim element to the elements to be controlled and comprises a switch 18 that is provided in the vicinity of the orifice 4 in the case of an air outlet device. The switch 18 is actuatable between an open position (FIG. 4), in which the function controlled by the secondary control device 16 is deactivated, and a closed position (FIG. 5), in which the function controlled by the secondary control device 16 is activated. The actuation of the switch 18 between its open position and its closed position is, for example, carried out by a button 20 that is movable in translation between a released position (FIG. 4) in which the switch 18 is open and a pressed position (FIG. 5) in which the switch 18 is closed.

The movement of the button 20 is controlled by the actuator 12. To this end, the actuator 12 is movable according to a second degree of freedom relative to the body 2 between a spaced apart position, in which the actuator 12 does not interact with the secondary control device 16, i.e. the button 20 is in its released position, and an activation position, in which the actuator 12 actuates the switch 18, i.e. the button 20 is in its pressed position.

Figure 3:
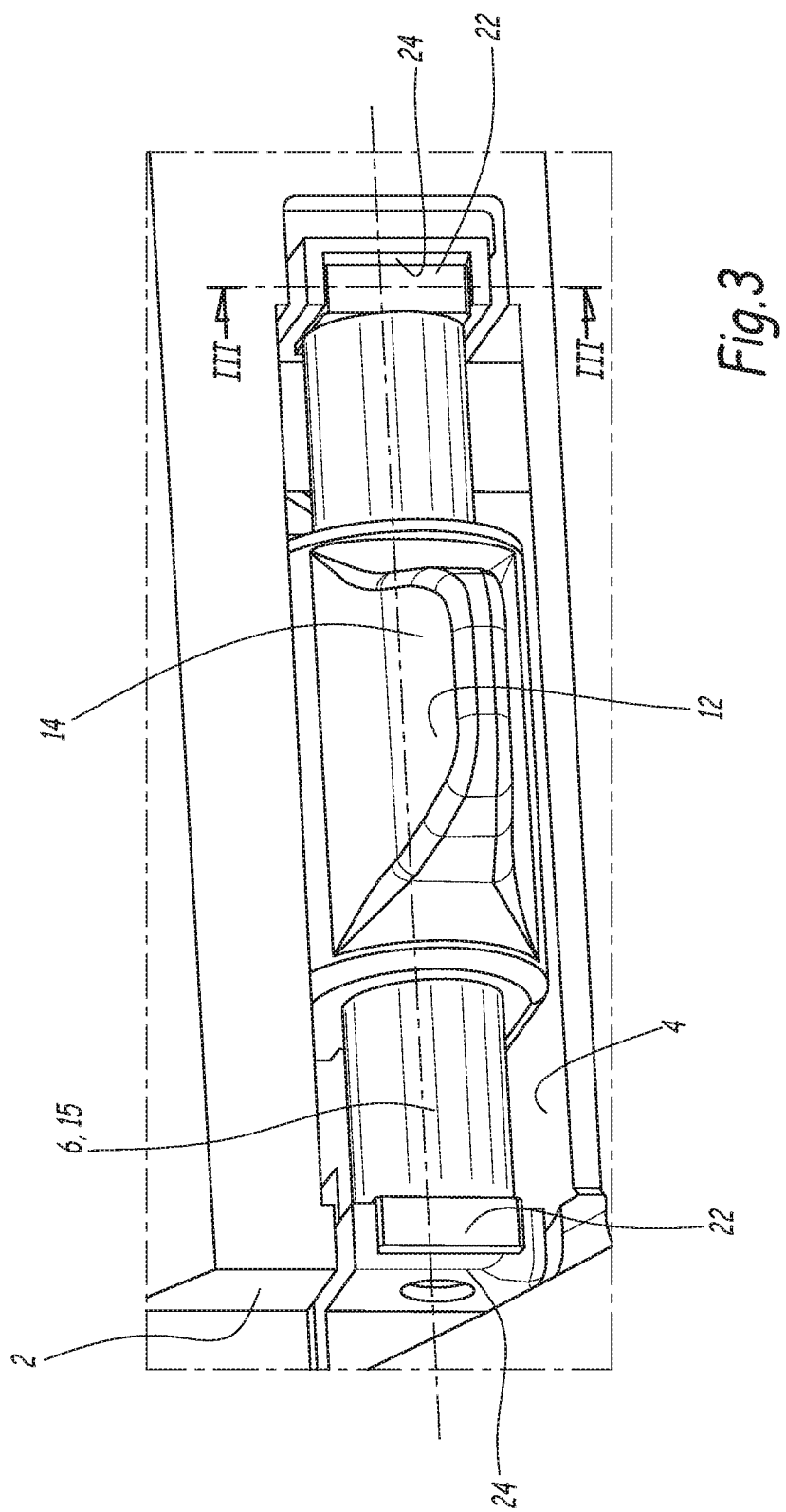
FIG. 3 shows a schematic perspective view of the actuator of the control device of FIG. 1.
Figure 4:
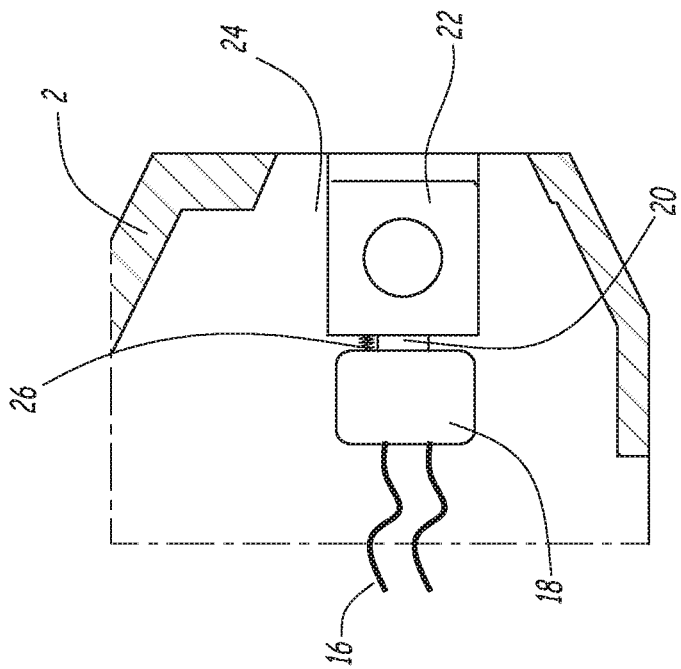
FIG. 4 shows a sectional view along the axis III-III of FIG. 3, with the switch in the open position.
Figure 5:
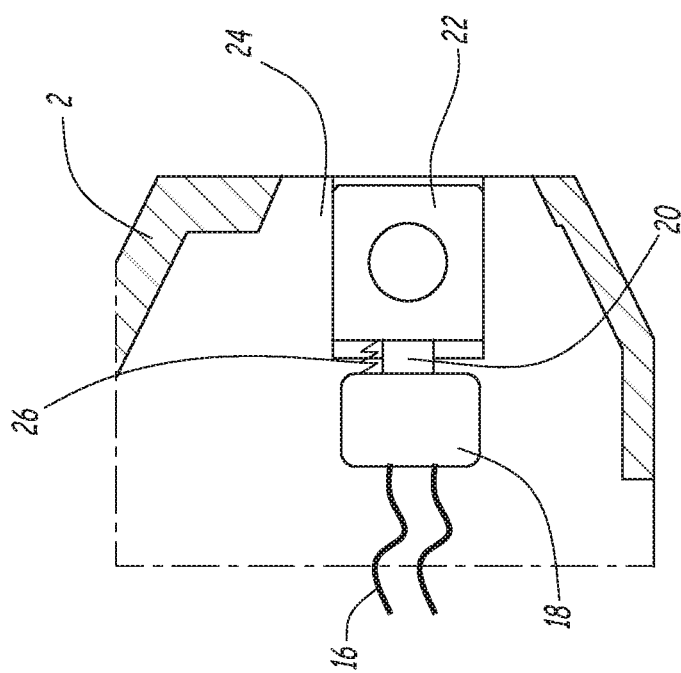
FIG. 5 shows a view similar to FIG. 4, with the switch in the closed position.

According to the first embodiment, in which the actuating element is formed by the movable element 6, and, as shown in FIGS. 3 to 5, the actuation of the switch 18 by the actuator 12 is effected via the movable element 6 and a support 22 on which the movable element 6 is mounted.

The support 22 is, for example, a bearing allowing the rotation of the movable element 6 about its axis in the case of a movable fin. The support 22 is mounted on the body 2 in a guide element 24 formed in the body 2 in a movable manner according to the second degree of freedom between a spaced apart position (on the left in FIG. 3 and FIG. 4), in which the support 22 does not press the button 20, and an activation position (on the right in FIG. 3 and FIG. 5), in which the support 22 presses the button 20.

The movable element 6 and its support 22 move together according to the second degree of freedom of the actuator 12, i.e. the movement of the actuator 12 according to the second degree of freedom causes a movement of the movable element 6 and the support 22 according to this second degree of freedom. On the other hand, the actuator 12 and the movable element 6 move together according to the first degree of freedom relative to the support 22, i.e. the movement of the actuator 12 according to the first degree of freedom causes a movement of the movable element 6 relative to the support 22 according to this first degree of freedom.

According to the second embodiment shown in FIG. 2, wherein the actuating element is formed by an element 15 that is distinct from the movable element 6, the actuating element 15 is mounted to be movable according to the second degree of freedom in a guide element 24 that is provided on an edge of the opening by means of a support 22, while the actuator 12 moves together with the actuating element 15 according to this second degree of freedom. In this case, the movable element 6 does not need to be movable according to the second degree of freedom. Thus, when the actuator 12 is moved according to the first degree of freedom on the actuating element 15, the transmission device causes the movement of the movable element 6 according to the first degree of freedom. When the actuator 12 is moved according to the second degree of freedom, the actuating element 15, but not the movable element 6, is moved according to the second degree of freedom.

According to the embodiment shown in the figures, the movement according to the second degree of freedom is a translation movement in the longitudinal direction, i.e. in a direction substantially perpendicular to the axis of rotation of the movable element 6.

Therefore, when the user wishes to activate the function of the air outlet device 1 controlled by the secondary control device 16, the user presses the actuator 12 in order to move it in translation in the longitudinal direction towards upstream relative to the air flow, in order to move, in the first embodiment, the movable element 6 and the support 22 in the longitudinal direction, the support being guided to its control position by the guide element 24 during this movement. The support 22, in its activation position, presses the button 20 as shown in FIG. 5, which moves the switch 18 to its closed position in the pressed position of the button 20, so that the function controlled by the secondary control device 16 is activated. According to the second embodiment and as described above, when the user presses the actuator 12, the support element 15 and the support 22 are moved according to the second degree of freedom by the actuator 12 without moving the movable element 6.

According to one embodiment, the spaced apart position and activated position of the support 22 are stable positions, i.e. the support 22 remains in the position in which it is located without external constraint on the support 22. Thus, when the user moves the support 22 to its activation position, it remains in the activation position as long as the user does not use the actuator 12 to move the support 22 to its spaced apart position. The button 20 is thus maintained in its pressed position and the switch 18 remains in its closed position. When the user pulls the actuator 12, the support 22 returns to its spaced apart position and the button 18 to its released position which places the switch 18 in its open position.

Thus, according to this embodiment, the activation of the function is effected by pressing the actuator 12, while its deactivation is effected by pulling on the actuator 12.

According to another embodiment shown in FIGS. 4 and 5, the support 22 may be biased towards its spaced apart position, for example by providing a biasing element 26 between the switch 18 and the support 22. In this case, when the user moves the support 22 to its activation position, the biasing element 26 is compressed, as shown in FIG. 5. When the user releases the actuator 12, the support 22 returns to its spaced apart position under the effect of the biasing element 26. Thus, according to this embodiment, only the spaced apart position is a stable position.

According to one embodiment, the biasing element 26 may be integrated in the button 20 and the button 20 may be of the "push" type, i.e. a first pressure on the button 20 moves the switch 18 to its closed position and the switch remains in this position, while the button 20 returns to its released position under the effect of the biasing element. Pressing the button 20 again moves the switch 18 to its open position and the switch remains in this position, while the button 20 returns to its released position. When the button 20 returns to its released position, the button 20 moves the support 22 to its spaced apart position.

Thus, according to this embodiment, the activation and deactivation of the function is always effected by pressing the actuator 12.

According to another embodiment, the switch is of the "digital switch" type. According to this embodiment, the movement of the support 22 to the activation position moves the button 20 which is arranged to emit an activation signal to activate the function controlled by the secondary control device 16. When the actuator 12 is released, the button 20 returns to its released position and returns the support 22 to its spaced apart position. Pressing the actuator 12 again moves the support 22 to the activation position, which moves the button 20 which emits a deactivation signal to deactivate the function controlled by the secondary control device 16. When the actuator 12 is released, the button 20 returns to its released position.

According to the embodiment shown in FIG. 3, the actuating element, i.e. the movable element 6 in the first embodiment or the element 15 that is distinct from the movable element in the second embodiment, is mounted in two supports 22 at each of its ends. The air outlet device 1 comprises two secondary control devices 16 each controlling a function of the control device and respectively controlled by a switch, wherein each support 22 moves a switch between its open position and its closed position. Thus, by pressing the actuator 12 at one of the ends of the actuating element, one of the functions of the control device may be controlled, while, by pressing the actuator at the other end, the other function of the control device may be controlled. Thus, a single actuator 12 allows both the control of the orientation and/or the flow rate of the air flow, as well as two different functions in the case of an air outlet device.

The second degree of freedom has been described as a movement in translation in the longitudinal direction, wherein pressing the actuator 12 moves the switch to the closed position. However, it should be understood that the switch could be moved to the closed position by pulling on the actuator 12. Alternatively, the second degree of freedom could be a rotational movement, for example, about a longitudinal axis, while the first degree of freedom is a rotational movement around a transverse axis. According to another variant, the movement according to the second degree of freedom could be a movement of translation and rotation.

The user may therefore adjust the control device using only the actuator 12, without having to actuate a button located at another location. The use of the control device is therefore simplified and the size of the control device is reduced.

The invention claimed is:

1. A control device of vehicle interior equipment, comprising:
    a body;
    at least one movable element that is movable according to at least a first degree of freedom with respect to the body;
    at least one actuator for moving the movable element relative to the body according to the first degree of freedom; and
    at least one secondary control device for controlling a function of the control device, a switch of the secondary control device being movable between an open position in which the function is deactivated, and a closed position in which the function is activated;
    wherein the actuator is movable according to a second degree of freedom relative to the body between a spaced apart position in which the actuator does not interact with the secondary control device, and a control position in which the actuator actuates the switch between its open position and its closed position, and
    wherein the actuator is mounted on an actuating element that is mounted in at least one support mounted on the body, the actuating element and the support being movable according to the second degree of freedom with respect to the body between a spaced apart position and an activation position, the support actuating the switch in said activation position.

2. The control device according to claim 1, wherein the actuating element is formed by the movable element, and wherein the actuating element is also movable according to the first degree of freedom relative to the support.

3. The control device according to claim 1, wherein the actuating element is formed distinct from the movable element, the actuator being mounted to be movable according to the first degree of freedom relative to the actuating element and relative to the support.

4. The control device according to claim 1, wherein the body comprises at least one guide, the support being movable according to the second degree of freedom in the guide between its spaced apart position and its activation position.

5. The control device according to claim 1, wherein the switch is in the open position in the spaced apart position of the support, and in the closed position in the activation position of the support.

6. The control device according to claim 5, wherein the spaced apart position and the activation position of the support are stable positions.

7. The control device according to claim 1, wherein the support is biased towards its spaced apart position, the operation of the switch to its open position and to its closed position being effected by moving the support from the spaced apart position to the activation position.

8. The control device according to claim 1, comprising at least two secondary control devices each for controlling a function of the control device, wherein the actuating element is mounted on at least two supports that are mounted on the body, wherein the supports are each movable according to the second degree of freedom relative to the body between a spaced apart position and an activation position, wherein the supports each move one of the switches of the secondary control devices to their activation position.

9. The control device according to claim 1, wherein the first degree of freedom is a movement in rotation about an axis of the movable member.

10. The control device according to claim 1, wherein the second degree of freedom is a movement in translation of the actuator.

11. The control device according to claim 1, wherein the control device is an air outlet device of a ventilation system of the vehicle, the body defining an orifice of an air outlet that is arranged to provide a flow of air into the vehicle cab, the movable element being a deflector to change the orientation and/or the flow rate of the air flow leaving the air outlet orifice when moved according to the first degree of freedom.

\* \* \* \* \*